Oct. 26, 1943.  O. FUSCALDO  2,332,908
FUEL INJECTION MEANS FOR SUPERCHARGED AIRCRAFT ENGINES
Filed Nov. 21, 1939   2 Sheets-Sheet 1

Ottavio Fuscaldo
Inventor,
by Morrison, Kennedy & Campbell
Attorneys.

Oct. 26, 1943.  O. FUSCALDO  2,332,908
FUEL INJECTION MEANS FOR SUPERCHARGED AIRCRAFT ENGINES
Filed Nov. 21, 1939  2 Sheets-Sheet 2

Inventor.
Ottavio Fuscaldo.
By *Attorney.*

Patented Oct. 26, 1943

2,332,908

UNITED STATES PATENT OFFICE 2,332,908

FUEL INJECTION MEANS FOR SUPERCHARGED AIRCRAFT ENGINES

Ottavio Fuscaldo, Milan, Italy; vested in the Alien Property Custodian

Application November 21, 1939, Serial No. 305,420
In Italy January 31, 1939

8 Claims. (Cl. 123—119)

This invention is for improvements relating to fuel injection means for supercharged aircraft engines, and especially to systems wherein the injectors are electromagnetically controlled.

The general object of the invention is to provide an improved form of device for this purpose which will be highly efficient and extend the possible range of control, as hereinafter described.

According to one aspect of the invention, it comprises an electromagnetically controlled device for injecting fuel in aircraft supercharged engines of the kind wherein a compressor reestablishes full power of the engine up to a predetermined altitude, the device characterised by the fact that it comprises the combination with an automatic air-feed control effective to maintain the absolute pressure of the air-feed constant up to a predetermined flight altitude, of a fuel-feed control effective to maintain the fuel-air ratio constant at higher altitudes, above said predetermined altitude, the fuel-feed control being arranged to come into operation upon the predetermined altitude having been exceeded.

As hereinafter more particularly described, the device according to the invention comprises a positive connection between the engine throttle and the means for varying the volume of the fuel injected, and it makes use simultaneously of two of such fuel-varying means which, due to their nature, have a simultaneous or cumulative action on all of the injectors of the engine, namely a change of fuel volume per unit of time of fuel pumped to the injectors, independently of the engine speed and of any adjustment of the length of time of each injection.

An embodiment of the invention is shown diagrammatically in the accompanying drawings by way of example, and for the purpose of illustrating how, with said embodiment, the principles of the invention may be carried into effect.

Figures 1, 2:
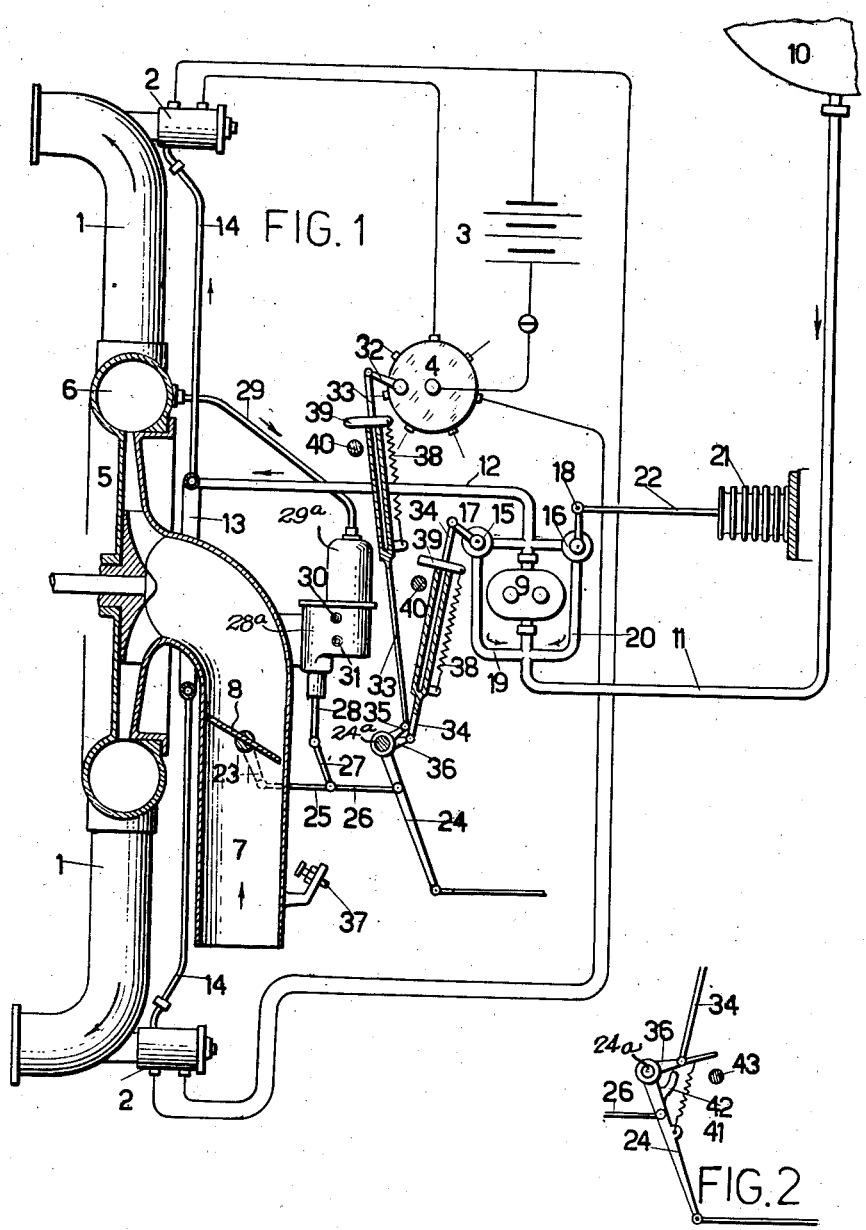
Figure 1 is a general view of the entire means or device.
Figure 2 is a fragmentary view showing an alternative construction in respect to a detail of the device, hereinafter described.

The device as shown in the drawings comprises two pipes for feeding the air to the cylinders of the engine. On these pipes are arranged valved injectors. The injectors include valves operated electromagnetically by current received from a battery 3. The current from the source or battery is in turn controlled by a rotating distributor 4, to time the valve openings and closings.

The device further comprises an air compressor 5 on the housing of which is a volute or annular air conduit 6 from which in turn radiate the air feed pipes 1 above mentioned.

The air compressor 5 draws its supply of air from the atmosphere through an air intake tube 7 in such quantities as are permitted by the degree of opening of a throttle 8 disposed within the intake tube.

A volumetric fuel pump 9 draws the fuel to be supplied to the engine from a fuel tank 10 along a supply pipe 11 and forces the fuel under pressure to the injectors 2 by way of a pipe 12, a distributor ring 13 and small branch pipes 14 therefrom.

Two by-passes 19 and 20 for the fuel 15 are arranged in parallel with one another, the inlets of the by-passes being connected with the pipe 12 and the outlets with the pipe 11 and the respective by-pass valves 15 and 16 being controlled by levers 17 and 18. The arrangement of the valved by-passes is such that by means of them the volume of fuel delivered by the pump to the injectors in unit time can be varied independently of the speed of the pump and each by-pass being controllable to this end independently of the other.

The first by-pass valve 15 is in co-operation with the distributor 4 and assists to maintain a constant fuel-air ratio of the mixture fed to the engine during speed changes, and it is in effect a part of the electromagnetic injection system.

The second by-pass valve 16 on the contrary serves to adjust the fuel-air ratio when flying at altitudes above a predetermined altitude at which the full power of the engine is re-established, being automatically operated for this purpose under the control of a device 21 which is responsive to changes in the atmospheric pressure. Thus, in the embodiment of the invention shown, the by-pass valve 16 is automatically controlled by an aneroid Sylphon box or bellows 21 through the intermediary of a connecting rod 22.

The air intake throttle 8 has on its pivot shaft an arm 23 which is connected to a lever 24 fast on a shaft 24ᵃ and forming part of a hand control for the throttle. The connection between the lever 23 and the lever 24 comprises a two-part connecting rod 25, 26 with its joint pivotally connected to the extremity of a link 27. The link 27 is in turn pivotally jointed to a rod 28 forming the piston rod of an automatic air feed pressure controller or servo-motor 28ᵃ. The control means 28ᵃ may be of any known construction and may comprise within its extension 29ᵃ an aneroid Sylphon box or instrument responsive to the absolute air pressure prevailing in the volute 6 of the supercharger, the said absolute pressure being communicated to the Sylphon box or bellows by way of a pipe 29 and there being a servo-control action with oil circulation by way of an inlet pipe 30 for the oil and a return pipe therefor 31.

The distributor 4 is provided with a lever 32 which is connected to the lever 17 of the by-pass valve 15 by a train comprising a connecting rod 33, a short arm 35 fast upon the hand lever shaft 24ᵃ, a second arm 36 also fast on the shaft 24ᵃ and a second connecting rod 34.

Associated with the hand lever 24 is an adjustable stop 37, the function of which is to determine the extreme position of the hand lever to correspond to the full-open position of the throttle 8.

The control 28ᵃ, which as hereinbefore remarked, may be of any known kind, may be provided similarly with any convenient form of operative connection to the throttle, such as the one shown, the principal consideration being that the operative connection should be such that the means for varying the rate of fuel injection, e. g., by-pass valve 15, should be actuable directly from the throttle hand lever 24 and without influence by the control means 28ᵃ, which in turn should be capable of controlling the throttle without influence by the hand lever. The throttle responds to both controls through the jointed rod 25, 26, thrust and pulled by the hand lever, deflected and straightened by the control means.

The levers 32, 17 should follow the respective movement of the arms 35, 36 and rods 33, 34 only through that arc of movement of the arms which corresponds to the opening of the throttle up to the position of the normal power of the engine operating near ground level, and the levers should be inoperative for the arc corresponding to further opening movement of the throttle during which the air feed pressure remains constant.

This condition or limiting action is shown provided for by so constructing the connecting rods 33, 34 that they will yield, as telescopically, so as to increase in length and thereby prevent further movement of the levers 32, 17 beyond the point corresponding to the opening of the throttle up to the position of normal power of the engine at ground level, each of the connecting rods being associated for this purpose with suitable stop means 40 operative on an extension 39 of the end of the rod which is connected to the lever 32 or 17 as the case may be, while a spring 38 tends to shorten the rod to normal length.

Figure 5:
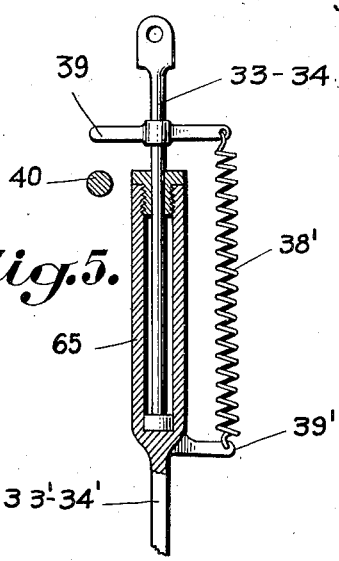
Fig. 5 is an enlarged view of the telescoping connecting rod 33 or 34 shown on a smaller scale in Fig. 1.

Such a construction is illustrated in Figure 1 where each of the connecting rods 33 and 34 is shown as comprising two relatively slidable sections, the lower section of which connects with the rockarm 35 or 36. The telescoping sections of the rods are drawn together so as normally to maintain each rod at its shortest length by the tension spring 38 which is strong enough to overcome the opposing resistance to movement of the lever 32 or 17 as the case may be. This telescoping connecting rod construction is shown more fully in the enlarged view of Fig. 5, which represents either the connecting rod 34 or the connecting rod 35. The lower parts of these connecting rods are marked on Fig. 5 as 33' and 34', and this part, at its upper end, is formed as a sleeve 65 within which slides telescopically the upper rod portion 33 or 34. The shortening spring is marked 38', and this is attached to a cross arm or projection 39 on the upper rod part and a similar projection 39' on the lower rod part, the spring under tension to hold the rod normally in its shortest condition. The fixed stop 40 is shown, limiting the downward movement of the cross arm 39, the rod 33 or 34, and the parts thereabove, connected to other elements of the mechanism.

On moving the hand lever 24 in the leftward direction towards stop 37, the arms 35, 36 move to a lower position, the springs 38 maintain the connecting rods 33, 34 at their minimum length and as a result the levers 32, 17 are caused to follow the motion of the arms 35, 36, as far as the position of the throttle corresponding to normal power of the engine at ground level. At this point the abutment 39 on each of the connecting rods 33, 34 comes down against its stop 40 so that from this moment onward, during the further movement to the left of the hand lever 24, the connecting rods 33, 34 become elongated while the levers 32, 37 remain inoperative, that is, held at the predetermined positions to which they were brought by the movement of the hand lever 24 to the point at which the abutments 39 came against the stops 40. The result is that during any period in which the feed pressure of the air in the supercharger remains constant, due to the action of the control means or servo-motor 28ᵃ, the timing by distributor 4 and the pressure of the fuel injection by pump 9 also remain constant.

Figure 2 illustrates an alternative form of yielding connection between the hand lever 24 and either or both of the arms 32, 17, according to which the arm 36 (or 35) is revolubly mounted or loose on the pivot shaft 24ᵃ of the hand lever 24 but is held in normal position in relation to the lever 24 by a spring 41 operative to hold the arm 36 (35) in abutment against a nose or lug 42 on the hand lever 24. With this arrangement, on moving the hand lever 24 in the direction towards the left, each of the arms 35, 36 and consequently the connecting rods 33, 34 are drawn down so as to follow the movement of the hand lever but only until the arms 35, 36 abut the stops 43, whereafter the arms 35, 36 and with them the levers 32, 17 are prevented from further following the movement to the left of the hand lever 24.

The operation of the apparatus shown in Figure 1 is as follows: The positions of the parts as shown are the positions occupied by them when the engine is running at minimum speed and at ground level. At this time the absolute air pressure in the volute 6 of the compressor is at a very low magnitude and its influence on the aneroid Sylphon box 29ᵃ of the control 28ᵃ is such that the piston rod 28 stands in its lowest position, in which position the connecting rods 25, 26 are aligned as shown and the throttle 8 is almost closed.

If now the hand lever 24 is moved gradually towards the left, up to the position of the throttle corresponding to normal power and speed of the engine at ground level, the air feed and the fuel injection progressively increase in the required ratio to one another and the engine accordingly accelerates.

Figure 3:
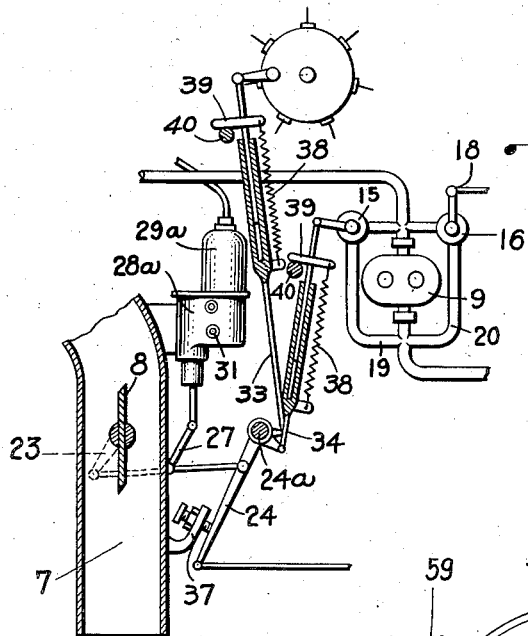
Fig. 3 is a partial view similar to Fig. 2 but showing the manual control lever in full load position of adjustment, with the throttle valve fully open.

On further moving the hand lever 24 to the left, beyond the above mentioned position, up to the stop 37, as shown in Fig. 3, the throttle is prevented from opening further on account of the fact that the control 28a has entered into operation, due to the rise in the absolute air pressure to the volute 6, with consequent lift of the piston rod 28 and link 27 and deflection of the connecting rods 25, 26 about the axis of pivotal connection of these rods to one another and to the link 27. As the result, therefore, the feed pressure of the air remains constant, while the stops 40 operate to prevent any further movement of the levers 32, 17 beyond the positions to which they have been brought in the first part of the movement to the left of the hand lever 24, that is, to the positions corresponding to the opening of the throttle up to the position of normal power of the engine at ground level, whereby the timing and the pressure of injection of the fuel into the engine also remain constant along with the feed pressure of the air in the supercharger.

The engine now runs at ground level at normal speed.

As the aeroplane rises gradually the atmospheric pressure decreases, with the result that the control 28a causes the piston rod 28 and the link 27 to move toward the normal (lowered) position gradually, so re-straightening the hinged rod 25, 26 extending from the hand lever 24 to the lever 23 of the throttle. The result is that the throttle is progressively opened in such a manner as to keep the absolute pressure in the volute 6 constant, until the throttle has been completely opened and the aeroplane has risen to the maximum altitude with re-establishment of the full power of the engine at that altitude.

The fuel-air ratio is, therefore, maintained constant, both during the acceleration of the engine and during the climb of the aeroplane.

From this moment on, the aeroplane may rise to a still higher altitude, but the air pressure in the volute 6 will decrease proportionally to the decrease in the surrounding atmospheric pressure and density, with the result that the by-pass valve 16 will then come into operation through the aneroid bellows 21 so as suitably to reduce the pressure of injection of the fuel to compensate for the reduction of the air pressure, the by-pass being opened for this purpose by the control bellows 21.

The by-pass valve 16 may be controlled by any other suitable form of automatic control in place of the aneroid Sylphon box 21 of the embodiment of the invention illustrated, or if desired, it may be controlled by a hand control.

It will be understood that during the operation of the by-pass valve 16, the power of the engine will decrease due to low density and lack of feed air, but the fuel-air ratio will remain constant and in this way the optimum conditions of operation will be obtained.

Figure 4:
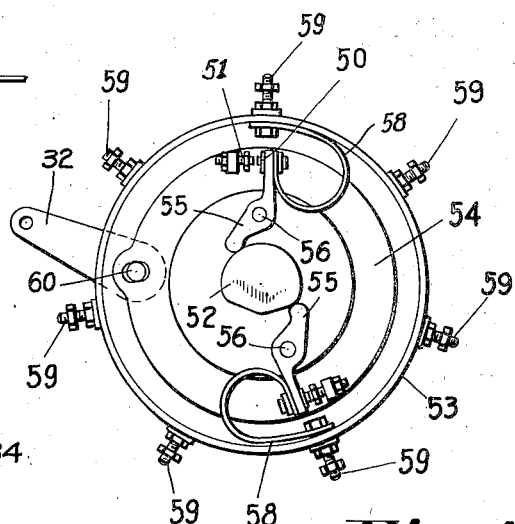
Fig. 4 is an elevation view of the interior parts of the distributor 4, showing the distribution operation in a manner more fully disclosed in copending application 330,125, filed April 17, 1940.

The distributor may be constructed and operate on the principles disclosed in said copending application 330,125, which may be referred to for details, the disclosure being generally as follows. The distributor 4 shown in Fig. 4 carries the adjusting arm 32 as also shown in Fig. 1, the remaining parts being as follows. There is a series of movable contacts 50, corresponding to the number of cylinders, two being shown, and cooperating fixed but adjustable contacts 51. The movable contacts are methodically operated by means of a central cam 52 mounted on or rotated by the engine shaft, the entire distributor mechanism being contained within a fixed casing 53. The several fixed contacts 51 are all mounted on a common ring or annular carrier 54 arranged for rotary adjustment, each contact being minutely initially adjustable on the ring. Each movable contact 50 is shown, for example, mounted by means of a rocker or pivoted lever 55, turning about a pivot pin 56 on the fixed support of the distributor. The cam 52 will turn at either half of the rotary speed of the engine shaft or at the full speed thereof, depending upon whether the engine is of the 4-stroke cycle or the 2-stroke cycle principle. The cam actuates the movable contacts 50 as follows. Each rocker 55 is formed, beyond its pivot pin 56, with an extension adapted to bear upon the cam 52 at certain times. Thus the cam has a large diameter dwell, and when the rocker bears on this it holds retracted the movable contact 50, as seen at the upper side of Fig. 4. The cam has also a dwell of short radius, and inclines between the two dwells. When the short radius comes opposite to any given rocker, as seen at the lower side of Fig. 4, the contact 50 rests against and is stopped by the complementary contact 51. In this position preferably the rocker stands out of contact with the cam, as shown. For each rocker is provided a metallic spring strip 58 and this serves to press each contact 50 normally toward the opposite contact, to close the distributor circuit leading to the corresponding injector, according to the diagram contained in Fig. 1. Each spring 58 serves not only for thus closing the contacts but also as a conductor, to connect each rocker with an exterior binding post 59. The adjustment of distribution or timing is effected from the manual control lever 24 through the telescoping connecting rod 33 and the distributor arm 32 as already mentioned, said arm having its pivot shaft formed with an eccentric portion 60, shown in Fig. 4 as engaged in a slot in the adjustable ring 54 which carries the fixed contacts 51. By this arrangement, when the arm 32 is thrown in one direction, this minutely retracts all of the fixed contacts 51 thereby shortening the duration of each closing of the circuit of each injector, and vice versa.

It will further be understood that the invention is susceptible to considerable modification as regards constructional details, such for example, as the form of the operative connections between the controls 21, 24 and 28a and the parts they respectively control, and all such variations are to be regarded as within the scope of the invention as set forth in the following statement of claims.

Having now described my invention and indicated how the same is to be carried out, what I claim as my invention is:

1. Fuel injection apparatus for a supercharged aircraft engine having suitable air intake throttle and engine-driven volumetric fuel pump; the same characterized by a charge-forming combination, comprising a first control device responsive to variations in supercharged air feed absolute pressure and operable up to a predetermined flight altitude to effect automatic adjustment of the throttle to maintain substantially constant the absolute air feed pressure and rate and thereby the fuel-air ratio; and a second control device responsive to progressive decrease in atmospheric air pressure and operable beyond such predetermined altitude to effect automatic adjustment of the fuel pumping action and injection rate to maintain substantially constant the fuel-air ratio; together with a supplemental adjusting mechanism interconnecting said two control devices so that with decrease of throttling by the first device occurs increase of fuel pumping by the second device, independently of their separate automatic controls, said supplemental mechanism being manually operable for speed control at will.

2. Apparatus as in claim 1 and wherein the supercharger intake throttle is adjustable independently either or both by the first control device responsive automatically to air feed pressure, or by a handle operable at will; there being a jointed connection from the handle to the throttle and a connection from the first device to deflect the joint of such connection.

3. Fuel injection apparatus for a supercharged aircraft engine having an air intake throttle, an engine-driven volumetric fuel pump, and an engine-driven rotary distributor adjustable by a shiftable member for varying the injection duration of electromagnetically operated fuel injectors; the same characterized by a charge-forming combination, including a first control means comprising an instrument exposed to and responsive to variations in supercharged air feed pressure and operable at lower flight altitudes with connections whereby it is adapted to effect automatic adjustment of the throttle to maintain substantially constant such air feed pressure and thereby the fuel-air ratio; a second control means comprising an instrument exposed and responsive to variations in atmospheric air pressure and operable at higher altitudes to effect automatic adjustment of the fuel pumping action to maintain substantially constant the fuel-air ratio; a throttle handle with connected means to adjust coordinately the throttle and the fuel pumping action by manual adjustment superimposed upon the automatic control thereof, such connected means consisting of a bypass to said fuel pump and a valve in said bypass and an operative connection from the handle to the bypass valve; and mechanism extending from the throttle handle to and regulating the rotary distributor which controls the fuel injection duration, such mechanism consisting of an operative connection from the handle to the shiftable distributor adjusting member.

4. Fuel injection apparatus for a supercharged aircraft engine having an air intake throttle and an engine-driven volumetric fuel pump; the same characterized by a charge-forming combination, comprising a throttle control means consisting of a pressure responsive instrument in communication with supercharge air inlet and responsive to variations in supercharged air feed pressure therein and operable at lower flight altitudes to effect automatic corrective adjustment of the throttle to maintain substantially steady such air feed pressure; the fuel pump having first and second bypasses back from its pressure to suction side; a throttle handle for manual engine control having connections to the first bypass adapted to adjust it coordinately with the throttle and operable at sea level; and a fuel feed control means consisting of a pressure responsive instrument exposed to atmospheric pressure arranged for effecting automatic corrective adjustment of the fuel pump action and operable at higher altitudes to maintain substantially steady the fuel feed in relation to the air feed; said fuel feed control means having connections to the second bypass adapted to adjust it for maintaining steady the fuel-air ratio at such higher altitudes despite decrease of engine power with more rarified atmosphere.

5. Apparatus as in claim 4, and wherein the engine has a rotary distributor with regulating lever to control injection; and the first by-pass comprises a valve with adjusting lever; said distributor and by-pass levers being each connected to the control handle to shift to follow the handle shift as far as a given point, corresponding to the degree of throttle opening for normal engine power at sea level, but with means to prevent further shift of either lever therebeyond during times of greater throttle opening when the air feed pressure is maintained steady by the first responsive control means.

6. Apparatus as in claim 4, and wherein the engine has a rotary distributor with regulating lever to control injection; and the first by-pass comprises a valve with adjusting lever; said distributor and by-pass levers being each connected to the control handle to shift to follow the handle shift as far as a given point, corresponding to the degree of throttle opening for normal engine power at sea level, but with means to prevent further shift of either lever therebeyond during times of greater throttle opening when the air feed pressure is maintained steady by the first responsive control means; there being provided between the handle and each lever a compound connecting rod yieldable with handle shift after the stopping of lever swing.

7. Apparatus as in claim 4, and wherein the engine has a rotary distributor with regulating lever to control injection; and the first by-pass comprises a valve with adjusting lever; said distributor and by-pass levers being each connected to the control handle to shift to follow the handle shift as far as a given point, corresponding to the degree of throttle opening for normal engine power at sea level, but with means to prevent further shift of either lever therebeyond during times of greater throttle opening when the air feed pressure is maintained steady by the first responsive control means; there being provided between the handle and each lever a telescoping connecting rod with its two parts resiliently held in normal relation, and a stop to hold the lever and adjacent end of the rod against excess shift, when the handle is shifted beyond the given point.

8. A charge forming combination for a supercharged aircraft engine having an air intake throttle means and a fuel pump means, comprising a handle shiftable for manual engine control, a first connection from the handle to the throttle to open the throttle further with advance of the handle, a second connection from the handle to adjust the pump for causing increase of fuel feed pressure and rate with advance of the handle, said connections being coordinated to preserve optimum fuel-air ratio when the handle is positioned for running below normal engine power; said first connection containing a member actuable to close further the throttle irrespective of further advance of the handle, an automatic device containing an instrument responsive to air feed pressure and arranged to actuate said first connection member to cause further throttle closing with tendency to increased air feed pressure thereby to maintain steady the air feed rate; said second connection including a limiting stop means operative with such further advance of the handle to stop further increase of fuel feed pressure and rate, thereby to maintain steady the fuel feed rate and preserve an optimum fuel-air ratio when running at high engine power, as for climbing; and an auxiliary control device comprising an aneroid bellows exposed to atmosphere and operating automatically at higher altitudes and having connections to the pump to vary the pumping action by reducing the fuel injection pressure and rate with rise into rarer atmosphere and vice versa.

OTTAVIO FUSCALDO.